April 18, 1944.  E. A. FIELD, JR  2,346,740
DRAFT REGULATOR
Filed Aug. 3, 1942  2 Sheets-Sheet 1
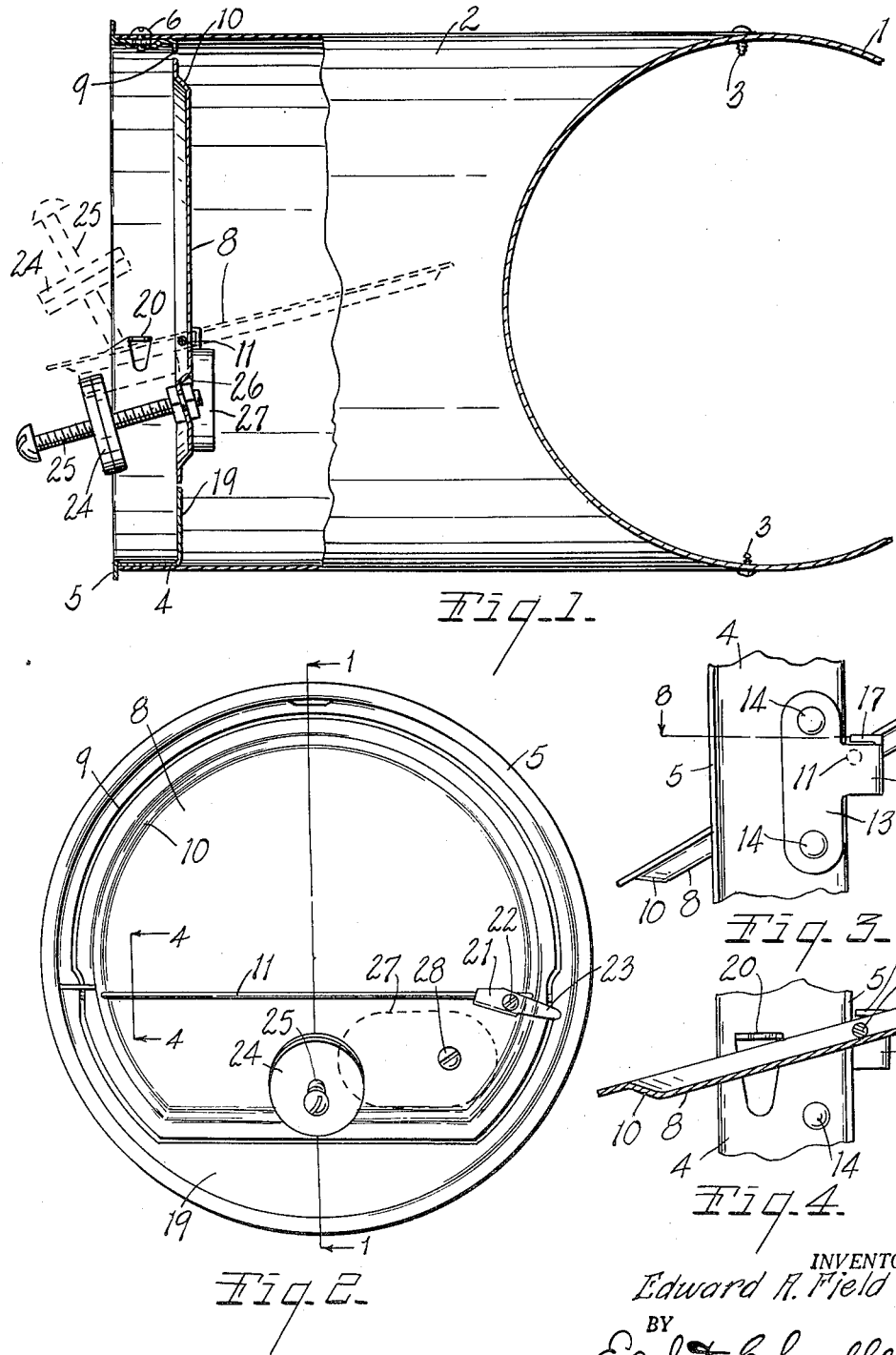
INVENTOR.
Edward A. Field Jr.
BY
Earl T. Chappell

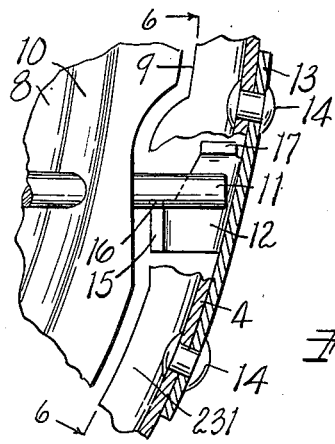
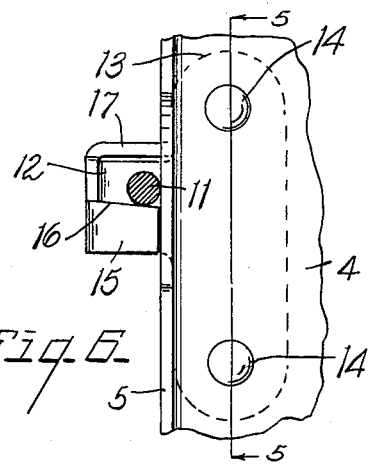
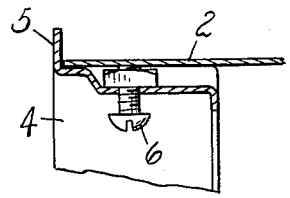
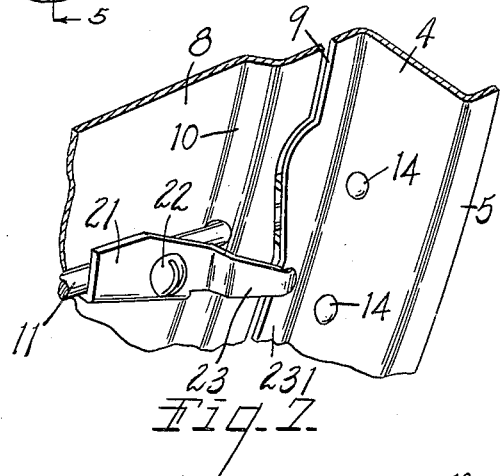
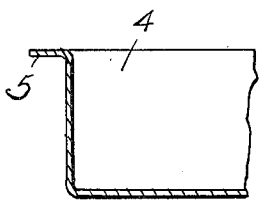
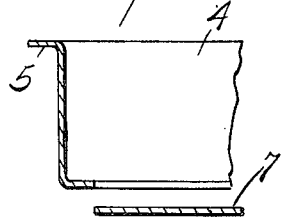
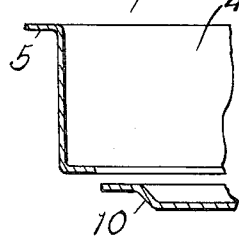
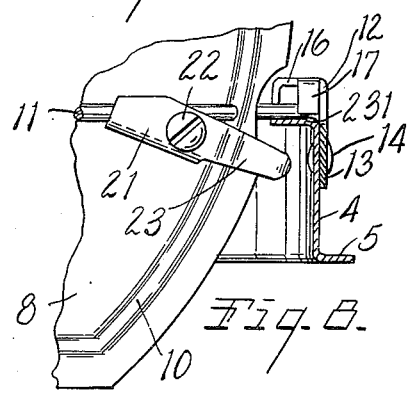

Patented Apr. 18, 1944

2,346,740

UNITED STATES PATENT OFFICE 2,346,740

DRAFT REGULATOR

Edward A. Field, Jr., Mendota, Ill.

Application August 3, 1942, Serial No. 453,401

18 Claims. (Cl. 236—45)

This invention relates to improvements in draft regulators.

The main objects of this invention are:

First, to provide an improved draft regulator for heaters and the like adapted to be attached to the smoke flue thereof to control the heater draft, said regulator having features of construction rendering the same extremely sensitive in operation, as well as much more simplified and economical of production.

Second, to provide a regulator or draft control of the type described having provision for the application of extra turning thrust to maintain the gate in a relatively wide open position.

Third, to provide a control of the type described, embodying a gate having a large pressure area differential, permitting the application of greater force on the gate for a given draft and thereby overcoming any likelihood of sticking due to accumulation of dirt or soot at the gate hinge as well as enabling a close lateral fit of the gate in the draft control housing.

Fourth, to provide a draft control including a gate having an improved frictionless hinge structure and improved stops for the gate in maximum open and closed position thereof which function in an effective and silent manner.

Fifth, to provide a draft control of the type described including a counterweighted gate in which the counterweight is adjustable at a predetermined angle to the plane of the gate, the latter having novel means for simplifying the mounting for the weight to this end.

Objects relating to details and economies of the invention will appear from the description to follow. The invention is defined in the claims.

A preferred embodiment of the invention is illustrated in the accompanying drawings, wherein:

Fig. 1 is a fragmentary view in side elevation partially broken away and in section on line 1—1 of Fig. 2, illustrating various details and structural relationships of parts.

Fig. 2 is a front elevational view.

Fig. 3 is an enlarged fragmentary view, illustrating provisions for effecting a rolling, highly frictionless mounting for the control gate of the regulator on its pivot support or bracket.

Fig. 4 is an enlarged fragmentary view in section on a line corresponding to line 4—4 of Fig. 2, further illustrating details of the gate structure and mounting therefor and the improved stop means for the gate according to the invention.

Fig. 5 is an enlarged fragmentary view in section on a line corresponding to line 5—5 of Fig. 6, illustrating further details of the pivot support shown in Fig. 3.

Fig. 6 is a fragmentary view in section on a line corresponding to line 6—6 of Fig. 5.

Fig. 7 is a fragmentary perspective view, illustrating one of the resilient gate limit stops of my invention.

Fig. 8 is a fragmentary view in section on a line corresponding to line 8—8 of Fig. 3, further illustrating details of the gate mounting structure.

Figs. 9, 10 and 11 are fragmentary diagrammatic sectional views, illustrating successive steps in the formation of the gate and gate frame in accordance with my invention, so as to effect a considerable economy of materials and likewise expedite and simplify the manufacture of the control.

Fig. 12 is a fragmentary detail view in section illustrating a somewhat modified manner of securing the draft control gate frame to the housing of the control.

In accordance with the present invention there is provided an improved draft control or regulator of the counterweighted gate type, said regulator being attachable to a smoke flue 1 of any type of heater unit (not shown), such as a space heater, stove, furnace or the like. In the illustrated embodiment the regulator comprises a cylindrical sheet metal control housing 2 adapted to fit against the side of the flue 1 and appropriately secured thereto as by screws 3, or alternately by a suitable strap passed around the flue 1. Details of such securing provisions have not been further illustrated, inasmuch as they are well known to the art.

At its outer open end, the housing 2 telescopingly receives an annular stamped sheet metal rim or gate frame 4 provided with a radially out-turned flange 5 abutting the outer end of housing 2. Screws 6 hold the frame 4 in place. In actual practice the frame is desirably stamped from a single sheet metal disk to the sharply dished outline illustrated in Fig. 9, following which the thus conformed member has a gate blank 7 punched from the inner portion thereof in the desired outline of the swingable gate 8 of the control. This procedure greatly simplifies and expedites the operation of forming the gate and effects a considerable economy of material, and of course, simultaneously results in the formation of the opening 9 in frame 4, which receives the gate. Following the blanking out of the gate blank 7, the latter is dished inwardly at 10, as illustrated in Fig. 11, for the important purposes to be hereinafter referred to.

Gate 8 is provided with a pivoting hinge pin in a simple and inexpensive manner by disposing an elongated wire rod or pin element 11 on the outer or forward side thereof, passing said rod through openings formed in the inclined annular dished or flange portion 10 of the gate at either side of the latter. This hinge pin is disposed eccentrically of the gate somewhat below the center of mass of the latter.

At opposite sides of the gate frame I mount hinged brackets 12, these brackets having plate-like attaching portions 13 which are riveted at 14 to the outer side of the frame. The brackets have forwardly or outwardly turned arms 15, the upper edges of which constitute bearings rollingly receiving the ends of the pintles 11. It will be noted that the upper edges of the bearing surfaces 16 of these arms 15 are forwardly or outwardly inclined relative to the housing 2. The outer portions of the brackets serve as stops limiting the longitudinal movement of the pintles, see Fig. 5. The purpose of inclining the bearing surfaces is to resist the tendency of the gate hinge pintles 11 to slide on said surfaces rearwardly or inwardly relative to the housing 2 into engagement with the outer bracket stops, thereby promoting a better journalling of the gate.

The bendable retaining tongues 17 are bent forwardly and downwardly over the pintles after they are arranged on their bearings and the guide is thus retained in its bearings while the pintles are permitted free rolling movement and this serves to afford a substantially frictionless support for the guide.

Referring to Figs. 1 and 2 it will be noted that the gate frame 4 has a considerable segment of the material of which it is fabricated, designated 19, left therein at the lower portion thereof, instead of blanking this material out as a part of the gate. The purpose of this is to provide a large area of the gate above the hinge pin 11 thereof, as compared to the gate area below the hinge pin. It will be appreciated that the force tending to open the gate is only equal to the pressure of air acting upon the differential in the area between said upper and lower areas. I have accordingly provided a relatively large differential, as compared to the size of the gate itself, so that a given air pressure effective on the gate swings the same with sufficient force to overcome any factors tending to cause sticking of the gate, for example, accumulation of dirt or soot at the hinge thereof.

The importance of the provision just described will be further appreciated from the following considerations. It is desirable to use a gate of relatively large diameter so that the sides of the gate fit quite closely relative to the inside of the gate frame supporting the same and so that only a small amount of air can pass around the sides of the gate. A draft control has greatly improved accuracy if most of the air is caused to pass over the top and around the bottom of the gate rather than a substantial portion passing around the sides. If the gate is made of relatively large diameter, however, the hinge therein cannot be placed very far below or above the pivotal center, as the case may be, for it is comparatively remote from the center of a large gate closely fitting its frame, then the sides of the gate will strike the inside of the frame after the gate is opened up but a few degrees. Nevertheless, as pointed out above, pressure tending to open the gate is only that represented by the difference between the forces acting on the gate at either side of its pivotal axis, and it follows that if the hinge pin is placed close to the center to obviate the possibility of striking the gate frame in the case of a large, close fitting gate, then the difference in said areas is normally not great. Accordingly, I have increased the difference in the areas by cutting off part of the lower areas of the gate and leaving this material in the gate supporting frame, at the same time eliminating the likelihood of the gate striking the sides of said frame, notwithstanding the fact that I have produced close lateral fit of the relatively large gate in said frame at the sides of the latter.

The importance of imparting the inwardly dished outline to the gate 8 has been briefly mentioned above. By disposing the edges of the gate slightly forwardly relative to the gate, i. e., with the dishing extending inwardly, I provide an extra thrust on the gate effective to hold the same open when it is in a comparatively wide open position as illustrated in dotted lines in Fig. 1. Without such an inwardly dished outline or equivalent provision, I have found that the gate will not open quite as wide as it should to maintain the desired draft properly. Changes in the counterweight of the gate do not appear to be sufficient to overcome this trouble, but the provision of the formed offset, which is particularly important on the upper portion of the gate, overcomes the difficulty perfectly. Dishing the gate uniformly about its periphery represents a simple manner of securing this outline, however a further advantage is possessed by the feature of inwardly dishing the gate uniformly around its periphery. This advantage resides in the fact that it provides the necessary clearance around the periphery of the gate to enable the same to swing freely in the frame opening 9, eliminating the need for bending the edge of the gate or otherwise deforming the latter to draw its periphery inwardly sufficiently to provide clearance at the frame. Also the gate is reinforced so that it does not easily spring or warp and effective means are provided to receive the pin 11.

In order to limit the movement of the gate between its closed and open positions illustrated respectively in solid and dotted lines in Fig. 1, I provide a stop member for the open position in the frame consisting of a relatively elongated spring stop lug or finger 20 struck inwardly from one side of the frame 4. This stop coacts with gate 8 in the manner clearly illustrated in Fig. 4 in the fully opened position of the gate. In order to limit the movement of the gate in its opposite position, I provide closing stop 21 secured by a screw 22 to the gate and in turn acting to clamp the gate to the hinge pin and prevent relative shifting of the gate and pin.

The stop member 21 includes a spring stop finger 23 which is offset forwardly to clear the dishing offset 10 of the gate and extends laterally for engagement with the radial extending portion or shoulder 231 of the gate frame 4, as clearly illustrated in Figs. 2 and 7. The resilient character of closing stop finger 23, likewise the open stop finger 20, contribute greatly to silence in operation of the present control. This is further contributed to by the fact that said stop members 20, 23 are located very close to the pivotal axis of the gate, since the velocity of the gate at such point is comparatively small and the impact is correspondingly reduced.

The gate 8 is provided with counterweights 24 which are threadedly receivable on a fixed supporting screw arm 25 extending forwardly of the gate. I have found it highly desirable to dispose the adjustable weights for adjusting travel at an angle of approximately 75° to the plane of the gate and, in order to accomplish this in the construction under consideration, the gate is dented forwardly at 26 to provide a small forwardly angled surface or land in which the supporting screw 25 is fixedly received, being normal to said surface and at a downward angle of 75° to the gate. The gate is balanced at the factory so that when adjustment counterweights 24 are at a position corresponding to zero draft setting of the gate, the center of gravity of the gate and all of the parts carried thereby is located at the axis of the gate. Accordingly when weights 24 are threaded outwardly, the center of gravity moves out in a direction parallel to the screw arm 25. In such manner I avoid discrepancies in various adjusted positions thereof.

In order to properly balance the gate and to offset any variations in the weights of the component parts thereof, a weight 27 is mounted on the inner side of the gate by means of an eccentrically disposed screw 28, near the lower part of the gate. The sole purpose of this is to enable the gate to be properly balanced before it leaves the factory. Thereafter it is not designed to be manipulated in any manner.

In Fig. 12 I illustrate a slightly modified, highly practical method of assembling the gate frame 4 on the cylindrical housing. In this construction the periphery of the frame is provided with one or more inwardly directed groovelike indentations in which a nut is disposed, being held against rotation by the groove. A stove bolt 6 extends through a hole in the frame and threads into said nut, extending into engagement with the inner side of the housing. This said bolt may be backed off, the frame inserted in the housing and the bolt taken up to clamp the frame 4 in its proper place, all in a moment's time.

The above described control is an exceedingly simple one and very quickly, easily and economically produced indeed. It is fool-proof and there are no parts requiring considerable attention and care in use. The control is sensitive and accurate in operation, also silent, due to the improved stop means discussed above. The details of the gate structure described render the same quickly responsive to pressure differential on the inner and outer sides thereof and very stable in holding an open position under comparatively high draft.

I have illustrated and described my invention in embodiments which I have found very practical. I have not attempted to illustrate or describe other embodiments or adaptations as it is believed this disclosure will enable those skilled in the art to embody or adapt my invention as may be desired.

Having thus described my invention, what I claim as new and desire to secure by Letters Patent, is:

1. In a draft regulator device, comprising a cylindrical open ended control housing, a gate frame of circular section disposed concentrically adjacent the open end of the housing having a control gate of generally circular outline pivoted thereon on a horizontal axis located relatively closely to and to one side of the center of the frame, the periphery of said gate being disposed closely adjacent said frame and the gate being truncated on a chord parallel to the gate axis to thereby afford a large pressure area differential on opposite vertical sides of said axis while enabling the latter to be disposed relatively close to the center of the frame and the gate periphery closely adjacent the frame, said gate being dished inwardly of the frame and housing adjacent the periphery thereof to define an outwardly inclined surface on which air pressure is effective in relatively wide open gate position to maintain the gate in said position, said gate having a hinge pin pivoting the same on the frame and the frame having lateral rolling bearing surfaces receiving opposed ends of the hinge pin for rolling movement, the gate being provided on one side of the axis thereof with an inclined land, an elongated threaded weight support disposed normally to the plane of the land, and a weight threadedly adjustable on said support for movement relative to the gate.

2. In a draft regulator device, comprising a cylindrical open ended control housing, a gate frame of circular section disposed concentrically adjacent the open end of the housing having a control gate of generally circular outline pivoted thereon on a horizontal axis located relatively closely to and to one side of the center of the frame, the periphery of said gate being disposed closely adjacent said frame and the gate being truncated on a chord parallel to the gate axis to thereby afford a large pressure area differential on opposite vertical sides of said axis while enabling the latter to be disposed relatively close to the center of the frame and the gate periphery closely adjacent the frame, said gate being provided at least adjacent the upper portion of the periphery thereof with an outwardly inclined surface on which air pressure is effective in relatively wide open gate position to maintain the gate in said position, said gate having a hinge pin pivoting the same on the frame and the frame having lateral rolling bearing surfaces receiving opposed ends of the hinge pin for rolling movement, the gate being provided on one side of the axis thereof with an inclined land, an elongated threaded weight support disposed normally to said land and extending at an angle to the plane of the gate, and a weight threadedly adjustable on said support for movement relative to the gate.

3. In a draft regulator device, comprising a cylindrical open ended control housing, and a gate frame of circular section disposed concentrically adjacent the open end of the housing having a control gate of generally circular outline pivoted thereon on a horizontal axis located adjacent the center of the frame, the periphery of said gate being disposed closely adjacent said frame and the gate being truncated on a chord parallel to the gate axis to thereby afford a large pressure area differential on opposite sides of said axis while enabling the latter to be disposed adjacent the center of the frame and the gate periphery closely adjacent the frame, said gate being provided at least adjacent the upper portion of the periphery thereof with an outwardly inclined surface on which air pressure is effective in relatively wide open gate position to maintain the gate in said position, said gate having a hinge pin pivoting the same on the frame and the frame having lateral rolling bearing surfaces receiving opposed ends of the hinge pin for rolling movement.

4. In a draft regulator device, comprising a cylindrical open ended control housing, a gate frame of circular section disposed concentrically adjacent the open end of the housing having a control gate of generally circular outline pivoted thereon on a horizontal axis located adjacent the center of the frame, the periphery of said gate being disposed closely adjacent said frame and the gate being truncated on a chord parallel to the gate axis to thereby afford a large pressure area differential on opposite vertical sides of said axis while enabling the latter to be disposed adjacent the center of the frame and the gate periphery closely adjacent the frame, said gate being dished inwardly of the frame and housing adjacent the periphery thereof to define an outwardly inclined surface on which air pressure is effective in relatively wide open gate position to maintain the gate in said position, the gate being provided on one side of the axis thereof with an inclined land, an elongated threaded weight support disposed normally to said land and extending at an angle to the plane of the gate, and a weight threadedly adjustable on said support for movement relative to the gate.

5. In a draft regulator device, comprising a cylindrical open ended control housing, a gate frame of circular section disposed concentrically adjacent the open end of the housing having a control gate of generally circular outline pivoted thereon on a horizontal axis to one side of the center of the frame, said gate being dished inwardly of the frame and housing adjacent the periphery thereof to define an outwardly inclined surface on which air pressure is effective in relatively wide open gate position to maintain the gate in said position, said gate having a hinge pin pivoting the same on the frame and the frame having lateral rolling bearing surfaces receiving opposed ends of the hinge pin for rolling movement, the gate being provided on one side of the axis thereof with an inclined land, an elongated threaded weight support disposed normally to said land and extending at an angle to the plane of the gate, and a weight threadedly adjustable on said support for movement relative to the gate.

6. In a draft regulator device, comprising a cylindrical open ended control housing, a gate frame of circular section disposed concentrically adjacent the open end of the housing having a control gate of generally circular outline pivoted thereon on a horizontal axis to one side of the center of the frame, said gate being provided at least adjacent the upper portion of the periphery thereof with an outwardly inclined surface on which air pressure is effective in relatively wide open gate position to maintain the gate in said position, said gate having a hinge pin pivoting the same on the frame and the frame having lateral rolling bearing surfaces receiving opposed ends of the hinge pin for rolling movement, the gate being provided on one side of the axis thereof with an inclined land, an elongated threaded weight support disposed normally to said land and extending at an angle to the plane of the gate, and a weight threadedly adjustable on said support for movement relative to the gate.

7. In a draft regulator device, comprising a cylindrical open ended control housing, and a control gate of generally circular outline controlling the open end of said housing and pivoted therein on a horizontal axis immediately to one side of the longitudinal center of the housing, the lateral and upper portion of the periphery of said gate being disposed closely adjacent said housing, and the gate being truncated on a chord parallel to the gate axis to thereby afford a large pressure area differential on opposite vertical sides of said axis while enabling the latter to be disposed relatively close to the center of the housing and the gate periphery closely adjacent the housing, said gate being dished inwardly of the housing adjacent the periphery thereof to define a surface on which air pressure is effective in relatively wide open gate position to maintain the gate in said position.

8. In a draft regulator, an open ended cylindrical draft control housing, an annular circular gate frame telescoped concentrically in the open end of said housing, a pivoted draft control gate blanked from the material of said frame in a generally circular outline concentric with the frame, said gate being truncated on one side of the gate pivotal axis on a chord parallel to the pivotal axis of the gate, thereby leaving a substantial amount of material in the frame immediately to one side of the arc of swing of the gate to obstruct flow of air at that side, pivots for the gate, said frame having members extending inwardly relative to the housing at either side of the frame providing rolling surfaces on which the pivots are received for rolling action, said pivots being located adjacent the center of the circular frame outline to afford a considerable arc of gate swinging movement without striking the frame and the truncating of the gate affording a substantial differential in area with relation to opposite sides of the gate pivotal axis, and elongated resilient stop fingers disposed on either lateral side of the gate effective to limit swinging movement thereof in its closed and extreme open positions.

9. In a draft regulator, an open ended cylindrical draft control housing, an annular circular gate frame telescoped concentrically in the open end of said housing, a pivoted draft control gate in a generally circular outline concentric with the frame, said gate being truncated on one side of the gate pivotal axis on a chord parallel to the pivotal axis of the gate, there being a substantial amount of material in the frame immediately to one side of the arc of swing of the gate to obstruct the flow of air at that side, pivots for the gate, said frame having members extending inwardly relative to the housing at either side of the frame providing rolling surfaces on which the pivots are received for rolling action, said pivots being located adjacent the center of the circular frame outline to afford a considerable arc of gate swinging movement without striking the frame and the truncating of the gate affording a substantial differential in area with relation to opposite sides of the gate pivotal axis, and elongated resilient stop fingers disposed on either lateral side of the gate effective to limit swinging movement thereof in its closed and extreme open positions.

10. In a draft regulator, an open ended cylindrical draft control housing, an annular circular gate frame telescoped concentrically in the open end of said housing, and a pivoted draft control gate in a generally circular outline concentric with the frame, said gate being truncated on one side of the gate pivotal axes on a chord parallel to the pivotal axis of the gate, there being a substantial amount of material in the frame immediately to one side of the arc of swing of the gate to obstruct flow of air at that side, and pivots for the gate, said frame having members extending inwardly relative to the housing at either side of the frame providing rolling surfaces on which the pivots are received for rolling action, said pivots being located adjacent the center of the circular frame outline to afford a considerable arc of gate swinging movement without striking the frame and the truncating of the gate affording a substantial differential in area with relation to opposite sides of the gate pivotal axis.

11. In a draft control, a cylindrical housing, an annular gate frame formed as a sheet metal stamping and fitting within the outer end of said housing and having an inturned flange at its inner end defining the gate opening, a gate dished to provide an outwardly inclined border portion terminating in a flange-like rim, a pintle extending across the front of said gate and through the said inclined portion thereof, hinge brackets on said frame provided with inclined bearing portions for said pintle, said bracket being provided with portions limiting the axial movement of said pintle, said pintle supporting said gate when in its closed position with its said rim in the plane of the inturned flange of said frame, and a stop member mounted on said gate to clamp said pintle for preventing movement of the gate axially of said pintle, said stop member projecting beyond the periphery of the gate to coact with said flange of the frame member when the gate is in closed position.

12. In a draft control, a cylindrical housing, an annular gate frame formed as a sheet metal stamping and fitting within the outer end of said housing and having an inturned flange at its inner end defining the gate opening, a gate dished to provide an outwardly inclined border portion terminating in a flange-like rim, a pintle extending across the front of said gate and through the said inclined portion thereof, said pintle supporting said gate when in its closed position with its said rim in the plane of the inturned flange of said frame, and a stop member mounted on said gate to clamp said pintle for preventing movement of the gate axially of said pintle, said stop member projecting beyond the periphery of the gate to coact with said flange of the frame member when the gate is in closed position.

13. In a draft control, a cylindrical housing, an annular gate frame formed as a sheet metal stamping and fitting within the outer end of said housing and having an inturned flange at its inner end defining the gate opening, a gate dished to provide an outwardly inclined border portion terminating in a flange-like rim, a pintle extending across the front of said gate and through the said inclined portion thereof, said pintle supporting said gate when in its closed position with its said rim in the plane of the inturned flange of said frame, and a stop member mounted on said gate to clamp said pintle for preventing movement of the gate axially of said pintle, said stop member projecting beyond the periphery of the gate to coact with said flange of the frame member when the gate is in closed position, said frame having a finger-like stop member struck inwardly therefrom and with which the gate engages when in fully open position.

14. In a draft control, a housing, a gate frame at the front end of the said housing, a gate, a pintle extending across the said gate, said gate having portions through which said pintle is disposed, hinge brackets on said frame provided with outwardly inclined bearing portions for the ends of said pintle, said bracket being provided with portions limiting the axial movement of said pintle, said pintle supporting said gate when in its closed position with its rim in the plane of the inturned end flange of said frame, and a stop member mounted on said gate to prevent movement of the gate axially of said pintle, said stop member projecting beyond the periphery of the gate to coact with said frame member.

15. In a draft control, a cylindrical housing, an annular gate frame having an inturned flange at its inner end defining the gate opening, a gate dished to provide an outwardly inclined border portion, a pintle extending across the front of said gate and through the said inclined portion thereof, hinge brackets on said frame provided with outwardly inclined bearing portions for the ends of said pintle, said bracket being provided with portions limiting the axial movement of said pintle, and a stop member mounted on said gate to coact with said flange of the frame member when the gate is in closed position, said frame having a finger-like stop member struck inwardly therefrom at the opposite side of the frame and with which the gate engages when in fully open position.

16. In a draft control, a cylindrical housing, an annular gate frame having an inturned flange at its inner end defining the gate opening, a gate dished to provide an outwardly inclined border portion, a pintle extending across the front of said gate and through the said inclined portion thereof, hinge brackets on said frame provided with outwardly inclined bearing portions for the ends of said pintle, said bracket being provided with portions limiting the axial movement of said pintle, and a stop member mounted on said gate to coact with said flange of the frame member when the gate is in closed position.

17. In a draft control, a cylindrical housing, an annular gate frame having an inturned flange at its inner end defining the gate opening, a gate dished to provide an outwardly inclined border portion, a pintle extending across the front of said gate and through the said inclined portion thereof, and hinge brackets on said frame provided with outwardly inclined bearing portions for the ends of said pintle, said bracket being provided with portions limiting the axial movement of said pintle.

18. In a draft control, a cylindrical housing, an annular gate frame having an inturned flange at its inner end defining the gate opening, a gate dished to provide an outwardly inclined border portion terminating in a flange-like rim, a pintle extending across the front of said gate and through the said inclined portion thereof, and hinge brackets on said frame provided with outwardly inclined bearing portions for the ends of said pintle, said bracket being provided with portions limiting the axial movement of said pintle, said pintle supporting said gate when in its closed position with its rim in the plane of the flange of said frame.

EDWARD A. FIELD, Jr.